UNITED STATES PATENT OFFICE.

LAWRENCE E. BARRINGER, OF SCHENECTADY, NEW YORK, ASSIGNOR TO GENERAL ELECTRIC COMPANY, A CORPORATION OF NEW YORK.

INSULATOR.

1,091,620.  Specification of Letters Patent.  Patented Mar. 31, 1914.

No Drawing.   Application filed May 14, 1908.  Serial No. 432,908.

*To all whom it may concern:*

Be it known that I, LAWRENCE E. BARRINGER, a citizen of the United States, residing at Schenectady, county of Schenectady, State of New York, have invented certain new and useful Improvements in Insulators, of which the following is a specification.

My present invention comprises a new insulating material for use in the electrical arts, possessing many valuable characteristics, and manufactured by a novel process, simple and inexpensive in character.

According to my process of manufacture, a hydrate such as slaked lime is intimately mixed with silica, either with or without the addition of fibrous material, such as asbestos, and the mixture so formed is steam treated to form a firm, dense insulator.

Although the proportions of the several ingredients may be varied throughout a considerable range, I aim to keep the hydrate in such excess that the steam treated article still contains some free hydrate.

The following is a suitable composition: Slaked lime 60 parts, flint 20 parts, asbestos 20 parts. The lime should be completely slaked, and the flint should preferably be clean and finely powdered. The mixture is moistened with water, pressed into the desired shapes, such as plates, tubes, blocks, etc., then dried, and finally subjected to a treatment with dry steam at a pressure of about 150 pounds. The duration of the steam treatment depends somewhat on the size and shape of the pressed bodies, but a period of six hours is suitable for small plates. The steaming action causes practically complete combination of the flint with part of the lime to form hydrous-calcium silicate, leaving uncombined, a certain per cent. of the soft calcium hydrate. Thus in the finished product there is hydrous-calcium silicate, asbestos fiber, and soft calcium hydrate; but no free flint or other gritty material. The proportion of silicate, the chief binding material, is comparatively small, but nevertheless the product is hard, firm, and strong enough to permit machining, as in a lathe or drill press. The absence of any free flint or other gritty material insures little wear on the machining tools. Similarly, the use of such a small proportion of flint in the raw mixture insures little wear on the steel molds by which the mixture is shaped into plates, tubes, etc.

In a certain sense, this composite insulator, consisting of asbestos and a free hydrate, held together by hydrous - calcium silicate, may, after machining, be regarded as finished and complete. It happens, however, that in the course of time, the free hydrate will change over, by exposure to air, into a carbonate, thereby giving to the insulating material greater strength and hardness. Thus, while the material may be easily machined just after manufacture, it increases in hardness to such an extent that after some time has elapsed it cannot be cut or machined except with difficulty.

It should be noted that the presence of free hydrate of calcium, or its equivalent, permits impregnation of the insulator with substances which enter into chemical combination and thereby form products which stay in the insulator and form part thereof. For instance, if the steam treated body is impregnated with rosin oil, a combination takes place between the terpenes of the oil and the calcium hydrate, forming a solid mass. This impregnation renders the material waterproof, but what is more important, does so by means of a filler produced in the pores of the material more stable than the rosin oil, and not liable to melt out, even when heated to the temperature at which the rosin oil was introduced.

In place of rosin oil as an impregnating material, I may use linseed oil, in which case partial saponification of the oil by the free calcium hydroxid ensues. Or melted stearic acids may be used to impregnate the compound, the treatment resulting in the formation of calcium stearate in the pores of the compound. Similarly, the formation of an oleate or palmitate may be produced in the pores of the material.

From what has been stated, it will be seen that the original or raw mixture is such that it can be molded to the desired shape in steel dies with very little wear on the dies; that it can be hardened by steam treatment to form a material which is dense and strong, but which nevertheless can be machined or cut to any desired shape without rapidly wearing away the cutting tools; that the composition is such that after manufacture to the desired form it becomes harder with age; and that the composition is such that during the process of impregnating with different substances to produce a waterproof condition a part of the material will react with the impregnating substances to form compounds of higher melting point and greater stability. All of these characteristics are of great importance, rendering my improved product most suitable for extensive commercial application as an electrical insulator.

What I claim as new and desire to secure by Letters Patent of the United States, is,—

1. The method which consists in mixing silica with an excess of calcium hydrate, pressing into the desired shape, treating with dry steam under pressure, and subsequently exposing the material so produced to a saponifying material to form a relatively stable waterproof compound by combination with the free calcium hydrate.

2. The method which consists in mixing asbestos fiber with silica and calcium hydrate, the calcium hydrate being in greater proportion than that necessary to combine with all the silica in producing hydrous calcium silicate, moistening the mixture and molding it into shape, treating with dry steam under pressure to produce chemical union between the silica and the calcium hydrate, machining the body so formed, and subsequently converting its excess of calcium hydrate into a lime soap.

3. The method which consists in mixing silica with a substantial excess of calcium hydrate, molding said mixture, treating with live steam under pressure to effect a reaction between the silica and hydrate, and subsequently impregnating the material so produced with stearic acid to form stearate of calcium in the mass by interaction with the free calcium hydrate.

4. A material suitable for electrical insulators and the like consisting essentially of asbestos, hydrous calcium silicate and lime soap.

In witness whereof, I have hereunto set my hand this 13th day of May, 1908.

LAWRENCE E. BARRINGER.

Witnesses:
BENJAMIN B. HULL,
HELEN ORFORD.

---

Copies of this patent may be obtained for five cents each, by addressing the "Commissioner of Patents, Washington, D. C."